United States Patent
Fountain

(10) Patent No.: US 9,291,122 B1
(45) Date of Patent: Mar. 22, 2016

(54) DIRECTIONALLY REVERSIBLE HOT AIR ENGINE SYSTEM

(71) Applicant: Daniel L. Fountain, Tucson, AZ (US)

(72) Inventor: Daniel L. Fountain, Tucson, AZ (US)

( * ) Notice: Subject to any disclaimer, the term of this patent is extended or adjusted under 35 U.S.C. 154(b) by 105 days.

(21) Appl. No.: 14/303,374

(22) Filed: Jun. 12, 2014

Related U.S. Application Data

(60) Provisional application No. 61/834,781, filed on Jun. 13, 2013.

(51) Int. Cl.
   *F02G 1/04* (2006.01)
   *F02G 1/043* (2006.01)

(52) U.S. Cl.
   CPC ............... *F02G 1/0435* (2013.01); *F02G 1/04* (2013.01); *F02G 1/043* (2013.01)

(58) Field of Classification Search
   CPC ......... F02G 1/04; F02G 1/043; F02G 1/0435; F02G 2243/34
   See application file for complete search history.

(56) References Cited

U.S. PATENT DOCUMENTS

2008/0295684 A1* 12/2008 Lin .................. F02G 1/044
  92/186

OTHER PUBLICATIONS

Ky-Ko Stirling Engine Fan, Feb. 1, 2013.*

* cited by examiner

*Primary Examiner* — Audrey K Bradley

(57) ABSTRACT

A reversible hot air engine system having operating modes for both engine and heat pump operation features a piston located in a piston cylinder that is located on a frame. The system features a displacer located in a displacer chamber that is horizontally located at a frame bottom. A rod first end is pivotally located on a piston second end. A rod second end is pivotally located on a displacer middle via a hinge. A rod housing is fluidly connected to the displacer chamber and the piston cylinder. The system features a flywheel located at a frame top. The system features, a crank having a wheel eccentrically and pivotally connected to a crank rod first end. A crank rod second end is pivotally located to a piston first end. The system features a heat source applied to a chamber end.

12 Claims, 6 Drawing Sheets

DIRECTIONALLY REVERSIBLE HOT AIR ENGINE SYSTEM

CROSS REFERENCE

This application claims priority to U.S. Patent Application No. 61/834,781, filed Jun. 13, 2013, the specification(s) of which is/are incorporated herein in their entirety by reference.

FIELD OF THE INVENTION

The present invention relates to hot air engines.

BACKGROUND OF THE INVENTION

Hot air engines have been around for approximately two hundred years in many successful designs. Hot air engines derive their power from the expansion and contraction of a gas, usually air that is heated and cooled to ultimately drive a crank. Many hot air engines work in a thermodynamic process knows as a Stirling cycle, named after Robert Stirling, a 19$^{th}$ century inventor.

All heat engines take a certain amount of heat and convert a percentage into work, while rejecting the remaining energy at a lower temperature. Schematically, as heat moves through the engine, from the hot to the cold side, the engine converts some of that energy into work. The key is that only a portion of that heat can be converted into work. The rest has to be expelled to a cold reservoir. The maximum efficiency can be mathematically calculated and is dependent upon the difference between the hot and cold reservoir. The greater the disparity, the more efficient the engine can be.

A heat pump is essentially a heat engine operating in reverse. Schematically, it resembles a heat engine with the directional arrows reversed. Energy is added and cold moves through the heat pump towards the hot side. Work must be added because hot naturally wants to move toward cold, so to make it go the other way, requires the addition of energy.

While in reality one can only achieve a fraction of the maximum efficiency, it is important to understand the heat engine process correctly as all engines from lawn mower engines to rocket engines utilize it. One cannot actually determine the thermal efficiency of an engine without an understanding of these basic thermodynamic principles. Challenges arise in that no engine or heat pump made looks and works like the ideal schematic representation. The present invention features a hot air engine system that looks and works like the ideal schematic representation. The present invention is a small solar and alternative fuel engine that will sit on a desk top and will run both clockwise and counterclockwise depending on which side of the engine is hot or cold. It will run when powered by solar energy with a Fresnel lens, or with a candle, or small alcohol burner. It will generate enough electricity to run a small motor or charge a battery while turning a five bladed seven inch fan. The engine will also work as a reversible heat pump when turned by an outside power source such as a drill.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a directionally reversible hot air engine system having operating modes for both engine and heat pump operation. In some embodiments, the system comprises a frame. In some embodiments, the system comprises a single piston. In some embodiments, the piston is located in a piston cylinder that is vertically located at the frame middle.

In some embodiments, the system comprises a displacer. In some embodiments, the displacer is located in a displacer chamber. In some embodiments, the displacer chamber is horizontally located at a frame bottom at a chamber middle. In some embodiments, the displacer chamber is perpendicularly located with respect to the frame and the piston cylinder.

In some embodiments, the system comprises a rod. In some embodiments, the rod is located in a rod housing. In some embodiments, a rod first end is pivotally located on a piston second end. In some embodiments, a rod second end is pivotally located on a displacer middle via a hinge. In some embodiments, the rod housing is fluidly connected to the displacer chamber and the piston cylinder.

In some embodiments, the system comprises a flywheel located at the frame top. In some embodiments, the system comprises, a crank having a wheel and a single crank rod. In some embodiments, the wheel is eccentrically and pivotally connected to a crank rod first end. In some embodiments, a crank rod second end is pivotally located to a piston first end. In some embodiments, the system comprises a heat source applied to a chamber first end or alternatingly to a chamber second end.

DESCRIPTION OF PREFERRED EMBODIMENTS

Figure 1:
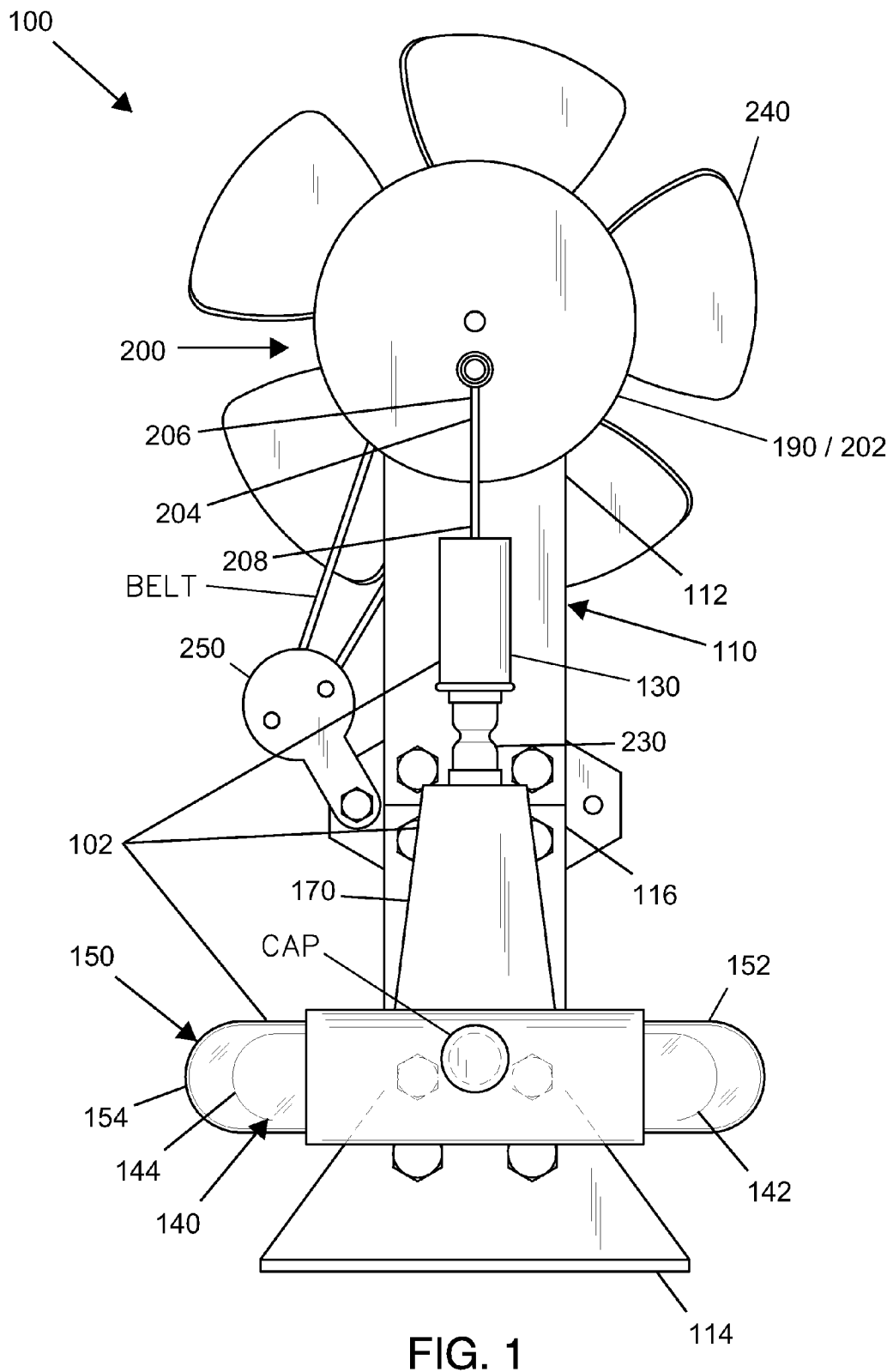
FIG. 1 shows a rear view of the present invention.
Figure 2:
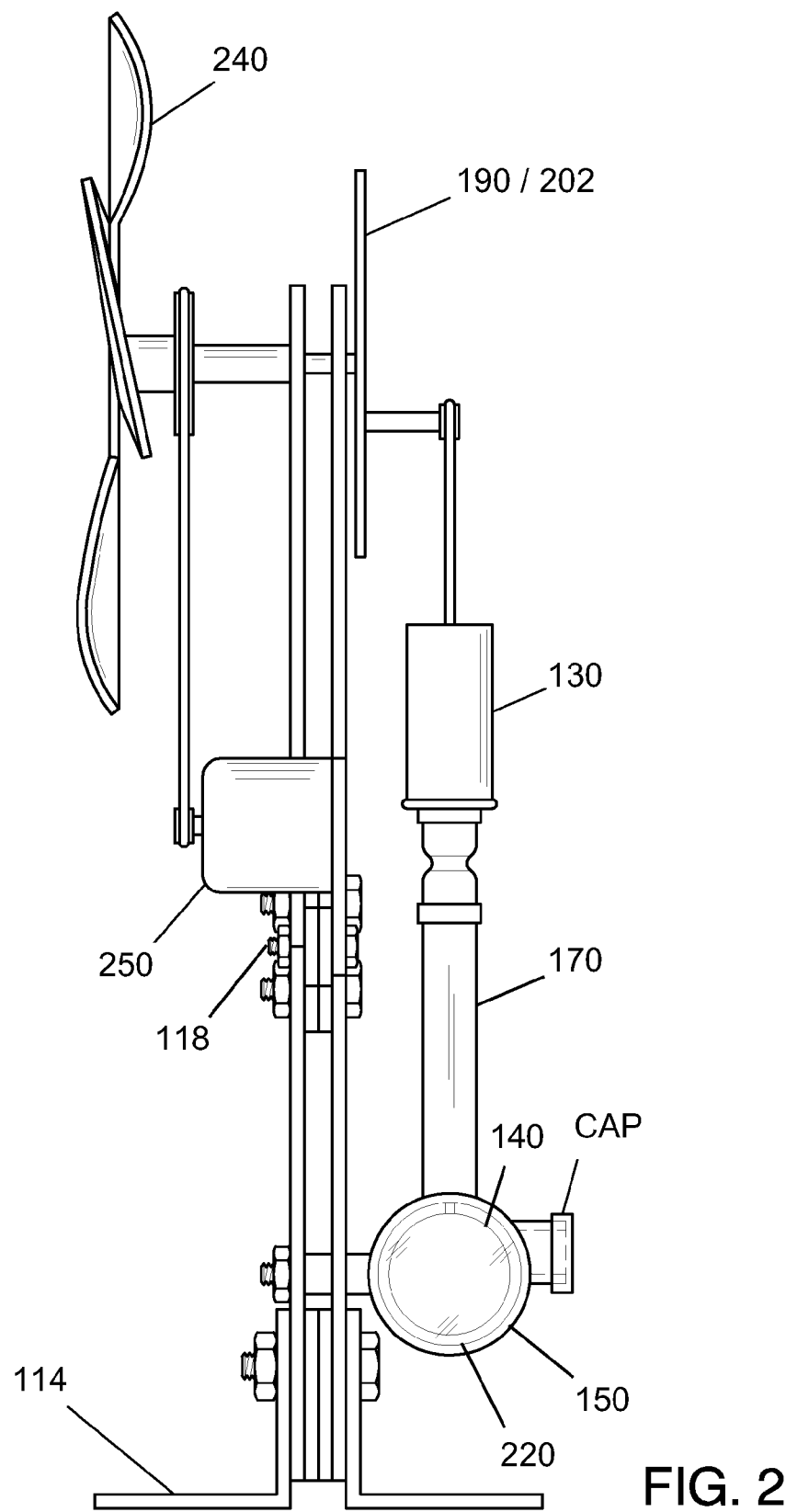
FIG. 2 shows a side view of the present invention.
Figure 3A:
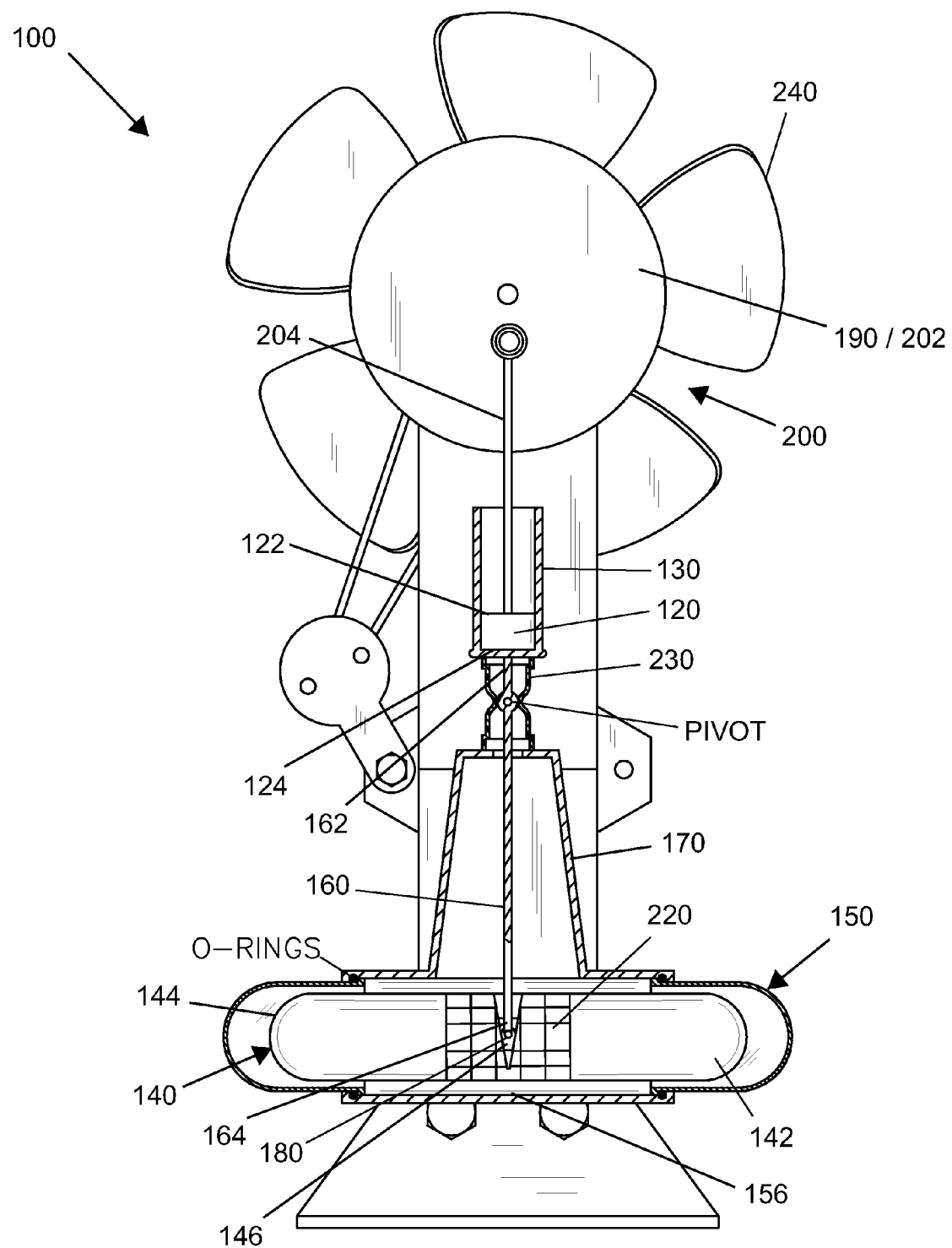
FIG. 3A shows a rear cross-sectional view of the present invention.
Figure 3B:
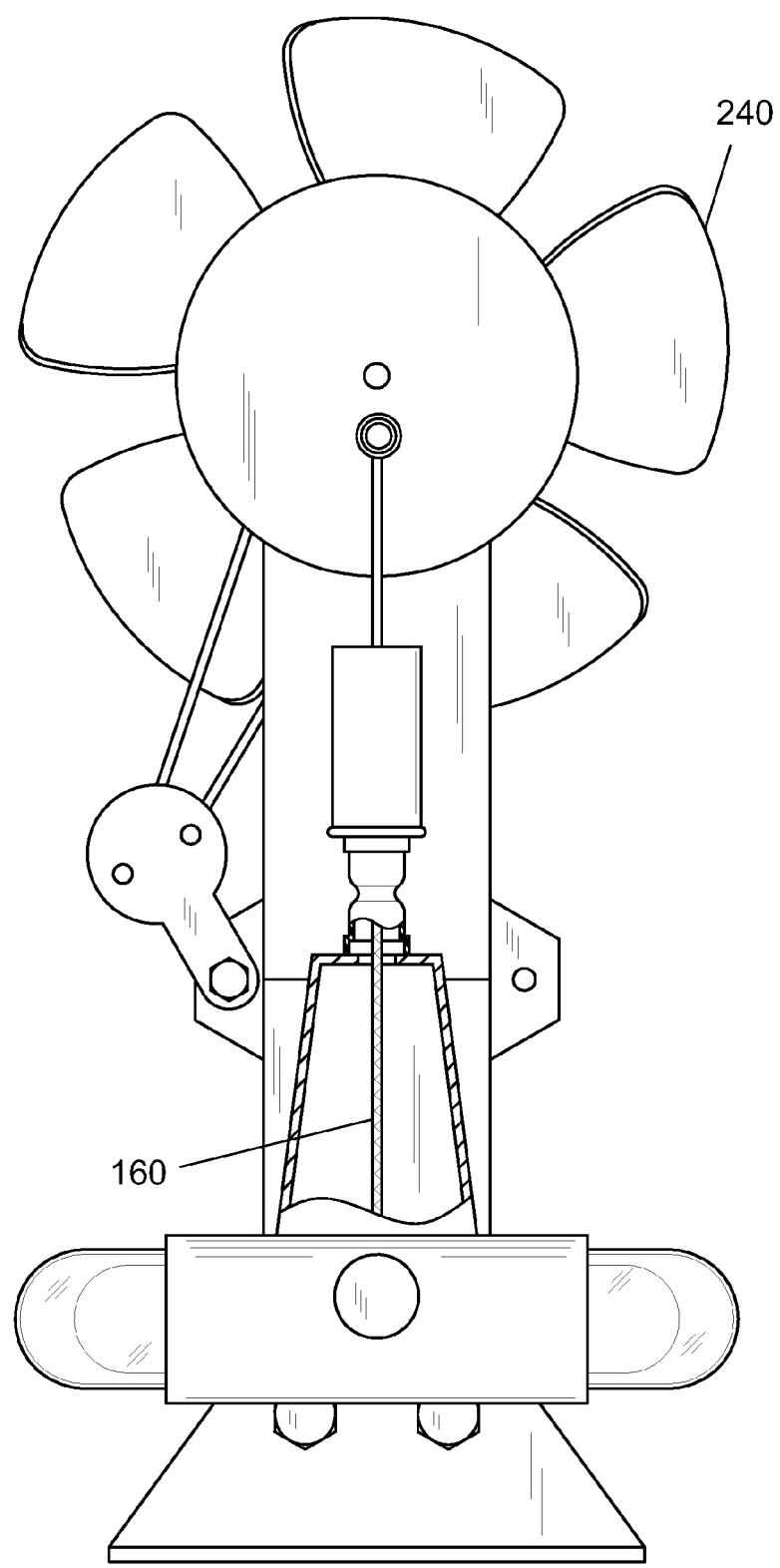
FIG. 3B shows a rear cross-sectional view of the present invention.
Figure 4:
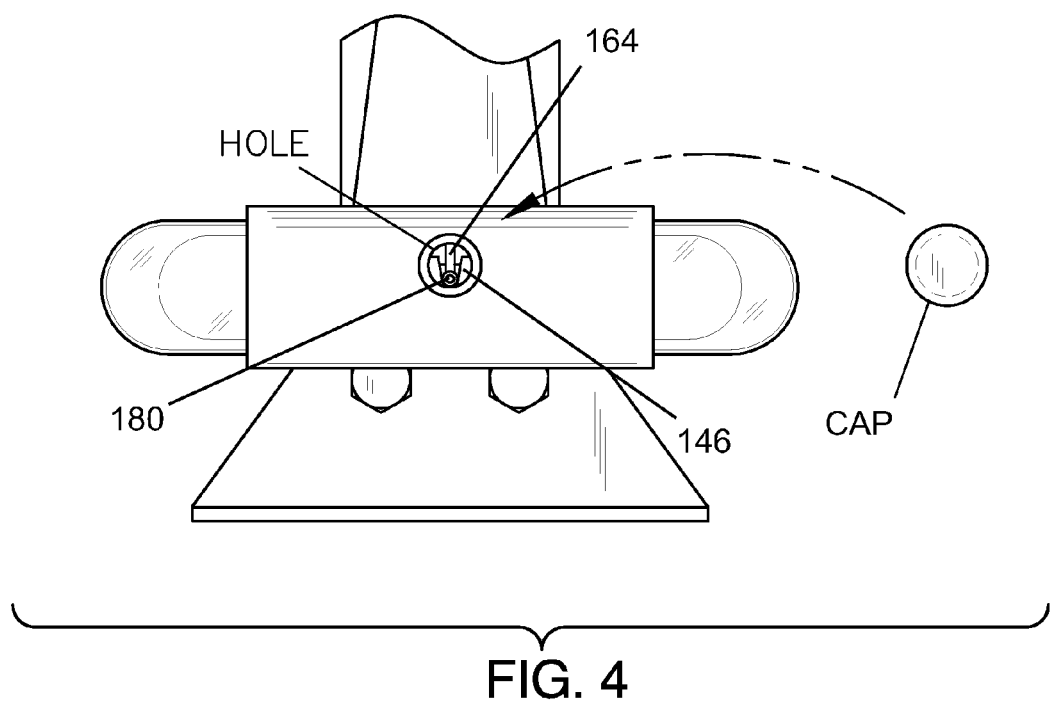
FIG. 4 shows a close up view of the displacer chamber of the present invention.
Figure 5:
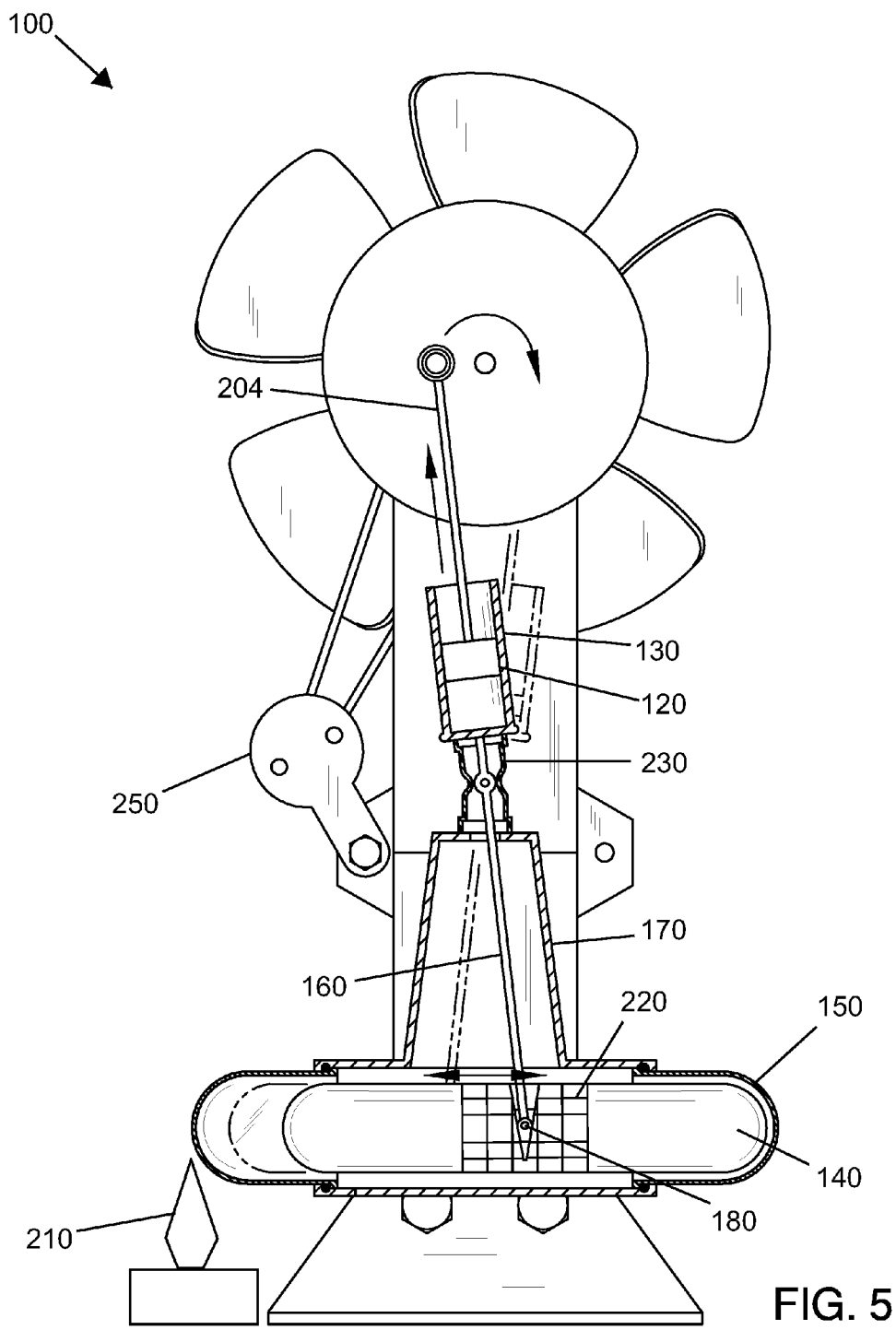
FIG. 5 shows a rear cross-sectional view of the present invention in operation.

Following is a list of elements corresponding to a particular element referred to herein:

100 Hot air engine system
    102 System chamber
    110 Frame
    112 Frame top
    114 Frame bottom
    116 Frame middle
    118 Frame attachment and adjustment bolt
    120 Piston
    122 Piston first end
    124 Piston second end
    130 Piston cylinder
    140 Displacer
    142 Displacer first end
    144 Displacer second end
    146 Displacer middle
    150 Displacer chamber
    152 Chamber first end
    154 Chamber second end
    156 Chamber middle
    160 Rod
    162 Rod first end 164 Rod second end
170 Rod housing
180 Hinge
190 Flywheel
200 Crank
202 Wheel
204 Crank rod
206 Crank rod first end
208 Crank rod second end
210 Heat source
220 Regenerator
230 Rubber boot
240 Fan blade
250 Generator Referring now to FIG. 1-5, the present invention features a directionally reversible hot air engine system (100) having operating modes for both engine and heat pump operation. In some embodiments, a reversible direction hot air engine system that requires no reconfiguration (100) is believed to be novel.

In some embodiments, the system (100) comprises a frame (110) having a frame top (112), a frame bottom (114), and a frame middle (116).

In some embodiments, the system (100) comprises a single piston (120) having a piston first end (122) and a piston second end (124). In some embodiments, the piston (120) oscillates within a piston cylinder (130). In some embodiments, the piston cylinder (130) is vertically located at the frame middle (116). In some embodiments, the orientation of the piston cylinder (130) is critical to the novelty of the present invention.

In some embodiments, the system (100) comprises a displacer (140) having a displacer first end (142), a displacer second end (144), and a displacer middle (146). In some embodiments, the displacer (140) oscillates within a displacer chamber (150) having a chamber first end (152), a chamber second end (154), and a chamber middle (156). In some embodiments, the displacer (140) is smaller than and slidably inserted into the displacer chamber (150).

In some embodiments, the displacer chamber (150) is horizontally located at the frame bottom (114) at the chamber middle (156). In some embodiments, the displacer chamber (150) is perpendicularly located with respect to the frame (110). In some embodiments, the displacer chamber (150) is perpendicularly located with respect to the piston cylinder (130). In some embodiments, the orientation of the displacer chamber (150) is critical to the novelty of the present invention.

In some embodiments, the system (100) comprises a rod (160) having a rod first end (162) and a rod second end (164). In some embodiments, the rod (160) is located in a rod housing (170). In some embodiments, the rod first end (162) is located on the piston cylinder (130). In some embodiments, the rod second end (164) is pivotally located on the displacer middle (146) via a hinge (180). In some embodiments, the rod (160) is perpendicularly located with respect to the displacer (140). In some embodiments, the rod housing (170) is fluidly connected to the displacer chamber (150) and the piston cylinder (130). In some embodiments, the displacer (140) moves back and forth in a horizontal plane thereby swinging the rod second end (164) from the hinge (180). In some embodiments, the swinging or rocking rod (160) moves the piston (120) up and down.

In some embodiments, the system (100) comprises a flywheel (190) rotatably located at the frame top (112). In some embodiments, the flywheel (190) comprises mass to assist in smooth operational movements of the piston (120), the rod (160) and the displacer (140) due to inertia.

In some embodiments, the system (100) comprises a crank (200) having a wheel (202) and a single crank rod (204). In some embodiments, the wheel (202) is rotatably located at a frame top (112). In some embodiments, the crank rod (204) comprises a crank rod first end (206) and a crank rod second end (208). In some embodiments, the wheel (202) is eccentrically and pivotally connected to the crank rod first end (206). In some embodiments, the crank rod second end (208) is pivotally located to the piston first end (122). In some embodiments, the crank is operatively connected to the flywheel (190).

In some embodiments, the system (100) comprises a heat source (210) applied to the chamber first end (152) or alternatingly the chamber second end (154) for rotation of the crank (200) in an opposite direction. In some embodiments, the heat source is a candle, a burner, or a solar power from the sun through an intensifying lens.

In some embodiments, upon operation, the heat source (210) is applied to the chamber first end (152) or the chamber second end (154). In some embodiments, the displacer (140) oscillates within the displacer chamber (150) via the heated and cooled air located in the displacer chamber (150). In some embodiments, the heated, expanded gas moves the displacer (140) to an opposite side of the displacer chamber (150).

In some embodiments, the displacer (140) moves in a linear motion. In some embodiments, the displacer (140) moves in an arcuate motion. In some embodiments, the displacer (140) moves in a rocking motion.

In some embodiments, the rod (160) is pivoted via the displacer (140). In some embodiments, the rod pivots based on the position of the displacer middle (146), for example, when the displacer middle (146) is directly under the piston (120), the piston (120) is in an upmost or lowermost position. For example, when the displacer (140) is closest to a chamber first end (152) or a chamber second end (154), the piston (120) is in a middle position.

In some embodiments, the piston (120) is cycled via the rod (160) pivoting the piston cylinder (130). In some embodiments, the crank (200) is rotated via the crank rod (204). In some embodiments, the piston actuates the crank rod (204).

In some embodiments, the system (100) is reversible upon applying a heat source (210) to an opposing chamber first end (152) or an opposing chamber second end (154) of the displacer chamber (150) with no other reconfiguration. This is different from prior art in the field in that there is a single crank rod (200) attached to the wheel (202) with one vertically located piston (120) and one horizontally located displacer (140) rather than two rods.

In some embodiments, the displacer chamber (150) comprises a regenerator (220) located thereon. In some embodiments, the regenerator (220) is constructed from a cylindrically shaped mesh having open ends and is located inside the displacer middle (146). In some embodiments, the regenerator (220) is constructed from a cylindrically shaped component having open ends and is located inside the displacer middle (146). The regenerator (220) absorbs heat from the system (100), maintains the heat, then allows the heat to be reabsorbed by the system (100).

In some embodiments, the flywheel (190) is the wheel (202).

In some embodiments, the system (100) is sealed via a rubber boot (230) located between the piston cylinder (130) and the rod housing (170). In some embodiments, the rod (160) extends through the rubber boot (230). In some embodiments, the system (100) is sealed via an elastomeric boot (230).

In some embodiments, the displacer (140) leads the piston (120) by one-fourth of a stroke during a cycle. In some embodiments, in this novel reversible design, with the orientation of the piston (120) and the displacer (140), the displacer (140) leads the piston (120) by one-fourth of a stroke during a cycle when reversed as well with no reconfiguration. The reversal is accomplished by applying the heat source (210) to the chamber first end (152) or the chamber second end (154). The crank rod (204) attachment does not need to be altered.

In some embodiments, a fan blade (240) is located on the frame top (112) and operatively connected to the flywheel (190). In some embodiments, the fan blade (240) is directly attached to the flywheel (190). In some embodiments, the fan blade (240) is attached to the flywheel (190) via a belt, chain or gear system.

In some embodiments, a generator (250) is located on the frame (110) and operatively connected to the flywheel (190). In some embodiments, the generator (250) can charge a battery.

In some embodiments, there are clear distinct advantages of the system (100) due to the surprising results. In some embodiments, the system (100) has a reduced vibration over standard Alpha, Beta, or Gamma Stirling hot air engines. In some embodiments, the system (100) has a reduced overheating over standard Alpha, Beta, or Gamma Stirling hot air engines. In some embodiments, the system (100) has a reduced air leakage over standard Alpha, Beta, or Gamma Stirling hot air engines. In some embodiments, the advantages are believed to be from a combination of the orientation of the piston (120) with regards to the displacer (140) and fewer moving parts, specifically, a single crank rod (204).

In some embodiments, the frame top (112) is pivotally located on the frame bottom (114) at the frame middle (116) for fine tuning alignment via a frame attachment and adjustment bolt (118). In some embodiments, when alignment is obtained, the frame attachment and adjustment bolt (118) is tightened. In some embodiments, the frame (110) is comprised of a single piece from the frame top (112) to the frame bottom (114). In some embodiments, the frame (110) is comprised of two pieces piece from the frame top (112) to the frame bottom (114). In some embodiments, the frame (110) is comprised of two or more pieces piece from the frame top (112) to the frame bottom (114). In some embodiments, the frame attachment and adjustment bolt (118) provides a precise means for alignment on a multi piece frame (118).

The present invention features a directionally reversible hot air engine system (100) having operating modes for both engine and heat pump operation. In some embodiments, the system (100) comprises a frame (110) having a frame top (112), a frame bottom (114), and a frame middle (116).

In some embodiments, the system (100) comprises a single piston (120) having a piston first end (122) and a piston second end (124). In some embodiments, the piston (120) oscillates within a pivoting piston cylinder (130). In some embodiments, the piston cylinder (130) is vertically located at the frame middle (116).

In some embodiments, the system (100) comprises a displacer (140) having a displacer first end (142), a displacer second end (144), and a displacer middle (146). In some embodiments, the displacer (140) oscillates within and is surrounded by a stationary cylindrical regenerator (220) comprised of mesh having open ends. In some embodiments, the regenerator (220) is centrally located in a displacer chamber (150) having a chamber first end (152), a chamber second end (154), and a chamber middle (156). In some embodiments, the displacer chamber (150) is horizontally located at the frame bottom (114) at the chamber middle (156). In some embodiments, the displacer chamber (150) is perpendicularly located with respect to the frame (110). In some embodiments, the displacer chamber (150) is perpendicularly located with respect to the piston cylinder (130).

In some embodiments, the system (100) comprises a rod (160) having a rod first end (162), and a rod second end (164). In some embodiments, the rod (160) is located in a rod housing (170). In some embodiments, the rod first end (162) is located on the piston cylinder (130). In some embodiments, the rod second end (164) is pivotally located on the displacer middle (146) via a hinge (180). In some embodiments, the rod (160) is perpendicularly located with respect to the displacer (140). In some embodiments, the rod housing (170) is fluidly connected to the displacer chamber (150) and the piston cylinder (130).

In some embodiments, the system (100) comprises a flywheel (190) rotatably located at the frame top (112).

In some embodiments, the system (100) comprises a crank (200) having a wheel (202) and a single crank rod (204). In some embodiments, the wheel (202) is rotatably located at a frame top (112). In some embodiments, the crank rod (204) comprises a crank rod first end (206) and a crank rod second end (208). In some embodiments, the wheel (202) is eccentrically and pivotally connected to the crank rod first end (206). In some embodiments, the crank rod second end (208) is pivotally located to the piston first end (122). In some embodiments, the crank is operatively connected to the flywheel (190).

In some embodiments, the system (100) comprises a heat source (210) applied to the chamber first end (152) or alternatingly the chamber second end (154).

In some embodiments, upon operation, the heat source (210) is applied to the chamber first end (152) or the chamber second end (154). In some embodiments, the displacer (140) oscillates within the displacer chamber (150) via the heated and cooled air located in the displacer chamber (150). In some embodiments, the rod (160) is pivoted via the displacer (140). In some embodiments, the piston (120) is cycled via the rod (160) pivoting the piston cylinder (130). In some embodiments, the crank (200) is rotated via the crank rod (204).

In some embodiments, the system (100) is reversible upon applying a heat source (210) to an opposing chamber first end (152) or an opposing chamber second end (154) of the displacer chamber (150) with no other reconfiguration.

In some embodiments, the system (100) comprises a sealed system chamber (102) comprising the rod housing (170), the displacer chamber (150), and the piston cylinder (130). In some embodiments, the system chamber (102) leaks only at the piston (120) between the piston (120) and the piston cylinder (130).

In some embodiments, the present invention features a directionally reversible hot air engine system (100) having operating modes for both engine and heat pump operation. In some embodiments, the system (100) comprises a frame (110).

In some embodiments, the system (100) comprises a piston (120) located in a piston cylinder (130). In some embodiments, the piston cylinder (130) is located on the frame (110). In some embodiments, a clearance between walls of the piston (120) and the walls of the piston cylinder (130) is extremely small, thereby reducing air leakage.

In some embodiments, the system (100) comprises a displacer (140) located in a displacer chamber (150). In some embodiments, the displacer chamber (150) is located on the frame (110).

In some embodiments, the system (100) comprises a rod (160) located in a rod housing (170). In some embodiments, the rod housing (170) is located on the frame (110). In some embodiments, a rod first end (162) is located on a piston cylinder (130). In some embodiments, a rod second end (164) is pivotally located on the displacer (140).

In some embodiments, the system (100) comprises a flywheel (190) located on the frame (110).

In some embodiments, the system (100) comprises a crank (200) located on the frame (110). In some embodiments, the crank (200) is connected to a crank rod (204). In some embodiments, the crank rod is connected to a piston first end (122). In some embodiments, the crank is operatively connected to the flywheel (190).

In some embodiments, the system (100) comprises a heat source (210) applied to the displacer chamber (150).

In some embodiments, upon operation, the heat source (210) is applied to a chamber first end (152) or a chamber second end (154). In some embodiments, the displacer (140) oscillates within the displacer chamber (150) via the heated and cooled air located in the displacer chamber (150). In some embodiments, the rod (160) is pivoted via the displacer (140). In some embodiments, the piston (120) is cycled via the rod (160) pivoting the piston cylinder (130). In some embodiments, the crank (200) is rotated via the crank rod (204).

In some embodiments, the displacer (140) slides on and is supported by a displacer interior wall or a regenerator interior surface. In some embodiments, the system (100) operates best in a vertical, upright orientation.

In some embodiments, the displacer (140) is suspended by the rod (160). In some embodiments, the displacer (140) slides inside the displacer (140). In some embodiments, the system (100) operates at all angles.

In some embodiments, the displacer (140) is suspended by a cord affixed to a rod housing top. In some embodiments, the displacer (140) oscillatingly slides inside the displacer (140). In some embodiments, the system (100) operates best in a vertical, upright orientation.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A directionally reversible hot air engine system (100) having operating modes for both engine and heat pump operation, wherein the system (100) comprises:
   (a) a frame (110);
   (b) a piston (120) disposed in a piston cylinder (130), wherein the piston cylinder (130) is disposed on the frame (110);
   (c) a displacer (140) disposed in a displacer chamber (150), wherein the displacer chamber (150) is disposed on the frame (110);
   (d) a rod (160) disposed in a rod housing (170), wherein the rod housing (170) is disposed on the frame (110), wherein a rod first end (162) is pivotally disposed on the piston cylinder (130), wherein a rod second end (164) is pivotally disposed on the displacer (140);
   (e) a flywheel (190) disposed on the frame (110);
   (f) a crank (200) disposed on the frame (110), wherein the crank (200) is connected to a crank rod (204), wherein the crank rod is connected to a piston first end (122), wherein the crank is operatively connected to the flywheel (190); and
   (g) a heat source (210) applied to the displacer chamber (150);
wherein upon operation, the heat source (210) is applied to a chamber first end (152) or a chamber second end (154), wherein the displacer (140) oscillatingly rocks within the displacer chamber (150) via heated and cooled air disposed in the displacer chamber (150), wherein the rod (160) is pivoted via the displacer (140), wherein the piston (120) is cycled via the rod (160) pivoting the piston cylinder (130), wherein the crank (200) is rotated via the crank rod (204).

2. A directionally reversible hot air engine system (100) having operating modes for both engine and heat pump operation, wherein the system (100) comprises:
   (a) a frame (110) having a frame top (112), a frame bottom (114), and a frame middle (116);
   (b) a single piston (120) having a piston first end (122) and a piston second end (124), wherein the piston (120) is oscillatingly disposed in a pivoting piston cylinder (130), wherein the piston cylinder (130) is vertically disposed at the frame middle (116);
   (c) a displacer (140) having a displacer first end (142), a displacer second end (144), and a displacer middle (146), wherein the displacer (140) is oscillatingly surrounded by a stationary cylindrical regenerator (220) comprised of mesh having open ends, wherein the regenerator (220) is centrally disposed in a displacer chamber (150) having a chamber first end (152), a chamber second end (154), and a chamber middle (156), wherein the displacer chamber (150) is horizontally disposed at the frame bottom (114) at the chamber middle (156), wherein the displacer chamber (150) is perpendicularly disposed with respect to the frame (110), wherein the displacer chamber (150) is perpendicularly disposed with respect to the piston cylinder (130);
   (d) a rod (160) having a rod first end (162), and a rod second end (164), wherein the rod (160) is disposed in a rod housing (170), wherein the rod first end (162) is disposed on the piston cylinder (130), wherein the rod second end (164) is pivotally disposed on the displacer middle (146) via a hinge (180), wherein the rod (160) is perpendicularly disposed with respect to the displacer (140), wherein the rod housing (170) is fluidly connected to the displacer chamber (150) and the piston cylinder (130);

(e) a flywheel (190) rotatably disposed at the frame top (112);

(f) a crank (200) having a wheel (202) and a single crank rod (204), wherein the wheel (202) is rotatably disposed at a frame top (112), wherein the crank rod (204) comprises a crank rod first end (206) and a crank rod second end (208), wherein the wheel (202) is eccentrically and pivotally connected to the crank rod first end (206), wherein the crank rod second end (208) is pivotally disposed to the piston first end (122), wherein the crank is operatively connected to the flywheel (190); and (g) a heat source (210) applied to the chamber first end (152) or alternatingly the chamber second end (154);

wherein upon operation, the heat source (210) is applied to the chamber first end (152) or the chamber second end (154), wherein the displacer (140) oscillatingly rocks within the displacer chamber (150) via heated and cooled air disposed in the displacer chamber (150), wherein the rod (160) is pivoted via the displacer (140), wherein the piston (120) is cycled via the rod (160) pivoting the piston cylinder (130), wherein the crank (200) is rotated via the crank rod (204);

wherein the system (100) is reversible upon applying the heat source (210) to an opposing chamber first end (152) or an opposing chamber second end (154) of the displacer chamber (150) with no other reconfiguration;

wherein the system (100) comprises a sealed system chamber (102) comprising the rod housing (170), the displacer chamber (150), and the piston cylinder (130), wherein the system chamber (102) leaks only at the piston (120) between the piston (120) and the piston cylinder (130).

3. The system (100) of claim 2, wherein the displacer (140) oscillatingly slides on and is supported by a displacer interior wall or a regenerator interior surface, wherein the system (100) operates best in a vertical, upright orientation.

4. The system of claim 2, wherein the displacer (140) is suspended by the rod (160), wherein the displacer (140) oscillatingly slides inside the displacer chamber (150), wherein the system (100) operates at all angles.

5. The system of claim 2, wherein the displacer (140) is suspended by a cord affixed to a rod housing top, wherein the displacer (140) oscillatingly slides inside the displacer chamber (150), wherein the system (100) operates best in a vertical, upright orientation.

6. The system (100) of claim 2, wherein the flywheel (190) is the wheel (202).

7. The system (100) of claim 2, wherein the system (100) is sealed via a rubber boot (230) disposed between the piston cylinder (130) and the rod housing (170).

8. The system (100) of claim 2, wherein the displacer (140) leads the piston (120) by one-fourth of a stroke during a cycle.

9. The system (100) of claim 2, further comprising a fan blade (240) disposed on the frame top (112) and operatively connected to the flywheel (190).

10. The system (100) of claim 2, further comprising a generator (250) disposed on the frame (110) and operatively connected to the flywheel (190).

11. The system (100) of claim 2, wherein the frame top (112) is pivotally disposed on the frame bottom (114) at the frame middle (116) for fine tuning alignment via a frame attachment and adjustment bolt (118), wherein when alignment is obtained, the frame attachment and adjustment bolt (118) is tightened.

12. A directionally reversible hot air engine system (100) having operating modes for both engine and heat pump operation, wherein the system (100) consists of:

(a) a frame (110) having a frame top (112), a frame bottom (114), and a frame middle (116);

(b) a single piston (120) having a piston first end (122) and a piston second end (124), wherein the piston (120) is oscillatingly disposed in a pivoting piston cylinder (130), wherein the piston cylinder (130) is vertically disposed at the frame middle (116);

(c) a displacer (140) having a displacer first end (142), a displacer second end (144), and a displacer middle (146), wherein the displacer (140) is oscillatingly surrounded by a stationary cylindrical regenerator (220) consisting of mesh having open ends, wherein the regenerator (220) is centrally disposed in a displacer chamber (150) having a chamber first end (152), a chamber second end (154), and a chamber middle (156), wherein the displacer chamber (150) is horizontally disposed at the frame bottom (114) at the chamber middle (156), wherein the displacer chamber (150) is perpendicularly disposed with respect to the frame (110), wherein the displacer chamber (150) is perpendicularly disposed with respect to the piston cylinder (130);

(d) a rod (160) having a rod first end (162), and a rod second end (164), wherein the rod (160) is disposed in a rod housing (170), wherein the rod first end (162) is disposed on the piston cylinder (130), wherein the rod second end (164) is pivotally disposed on the displacer middle (146) via a hinge (180), wherein the rod (160) is perpendicularly disposed with respect to the displacer (140), wherein the rod housing (170) is fluidly connected to the displacer chamber (150) and the piston cylinder (130);

(e) a flywheel (190) rotatably disposed at the frame top (112);

(f) a crank (200) having a wheel (202) and a single crank rod (204), wherein the wheel (202) is rotatably disposed at a frame top (112), wherein the crank rod (204) consists of a crank rod first end (206) and a crank rod second end (208), wherein the wheel (202) is eccentrically and pivotally connected to the crank rod first end (206), wherein the crank rod second end (208) is pivotally disposed to the piston first end (122), wherein the crank is operatively connected to the flywheel (190); and (g) a heat source (210) applied to the chamber first end (152) or alternatingly the chamber second end (154);

wherein upon operation, the heat source (210) is applied to the chamber first end (152) or the chamber second end (154), wherein the displacer (140) oscillatingly rocks within the displacer chamber (150) via heated and cooled air disposed in the displacer chamber (150), wherein the rod (160) is pivoted via the displacer (140), wherein the piston (120) is cycled via the rod (160) pivoting the piston cylinder (130), wherein the crank (200) is rotated via the crank rod (204);

wherein the system (100) is reversible upon applying the heat source (210) to an opposing chamber first end (152) or an opposing chamber second end (154) of the displacer chamber (150) with no other reconfiguration;

wherein the system (100) consists of a sealed system chamber (102) consisting of the rod housing (170), the displacer chamber (150), and the piston cylinder (130), wherein the system chamber (102) leaks only at the piston (120) between the piston (120) and the piston cylinder (130).

\* \* \* \* \*